US012792508B1

(12) United States Patent
Zhang et al.

(10) Patent No.: US 12,792,508 B1
(45) Date of Patent: Nov. 10, 2026

(54) MULTI-PASS PROGRAMMING FOR GARBAGE COLLECTION

(71) Applicant: MICRON TECHNOLOGY, INC., Boise, ID (US)

(72) Inventors: Peng Zhang, Los Altos, CA (US); Yu-Chung Lien, San Jose, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/199,511

(22) Filed: May 6, 2025

(51) Int. Cl.
*G06F 12/02* (2006.01)

(52) U.S. Cl.
CPC .. *G06F 12/0246* (2013.01); *G06F 2212/7205* (2013.01)

(58) Field of Classification Search
CPC ................ G06F 12/02; G06F 12/0246; G06F 2212/7205; G06F 3/06; G11C 16/04; G11C 16/10; G11C 16/34; G11C 16/16; G11C 11/56; G11C 2211/56; G11C 29/00; G11C 29/42
See application file for complete search history.

(56) References Cited

U.S. PATENT DOCUMENTS

| | | | | |
|---|---|---|---|---|
| 11,550,657 | B1 * | 1/2023 | Shappir | G11C 7/1069 |
| 2019/0095123 | A1 | 3/2019 | Lin | |
| 2019/0121725 | A1 | 4/2019 | Sehgal et al. | |
| 2020/0234780 | A1 * | 7/2020 | Papandreou | G11C 16/3418 |
| 2020/0393994 | A1 * | 12/2020 | Subbarao | G06F 3/0679 |
| 2024/0168652 | A1 | 5/2024 | Huang et al. | |
| 2024/0281144 | A1 | 8/2024 | Gohain et al. | |
| 2025/0077102 | A1 | 3/2025 | Dutta et al. | |

OTHER PUBLICATIONS

International Search Report and Written Opinion for International Application No. PCT/US2026/026781, mailed Aug. 21, 2026, 09 Pages.

* cited by examiner

*Primary Examiner* — Tracy C Chan
(74) *Attorney, Agent, or Firm* — Lowenstein Sandler LLP

(57) ABSTRACT

Whether a destination block of a memory device is a quad-level cell (QLC) block is determined responsive initiation of a garbage collection operation. Whether a source block of the memory device is a single-level cell (SLC) block is determined responsive to determining that the destination block is a QLC block. The destination block using a first pass-type programming mode with valid data of the source block is programmed during the garbage collection operation responsive to determining that the source block is not a SLC block.

20 Claims, 4 Drawing Sheets

MULTI-PASS PROGRAMMING FOR GARBAGE COLLECTION

TECHNICAL FIELD

Embodiments of the disclosure relate generally to memory sub-systems, and more specifically, relate to multi-pass programming for garbage collection.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
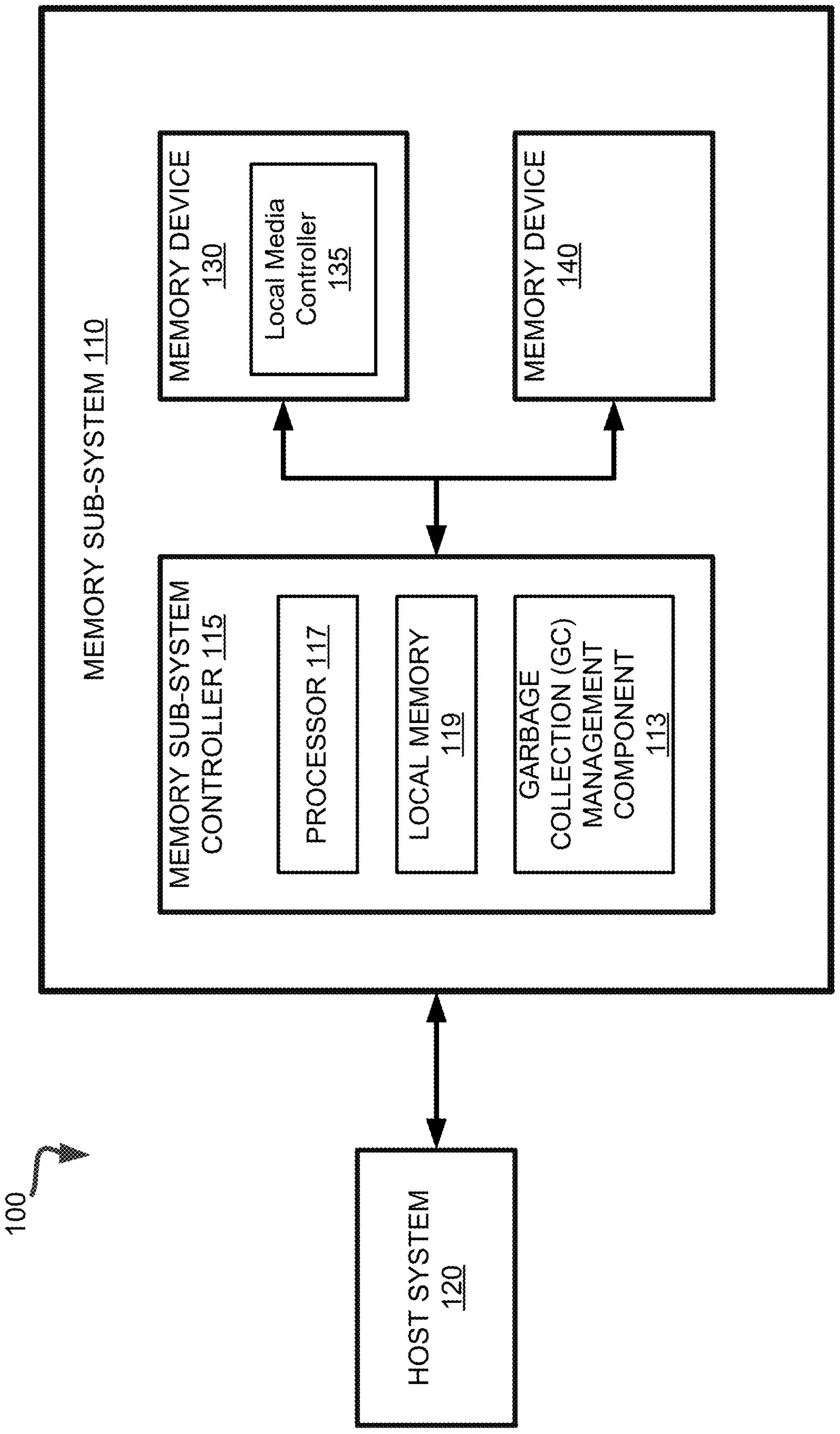
FIG. 1 illustrates an example computing system that includes a memory sub-system in accordance with some embodiments of the present disclosure.

Aspects of the present disclosure are directed to multi-pass programming for garbage collection. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Some memory devices use certain types of memory cells, such as quad-level cell (QLC) memory cells, which store four bits of data in each memory cell, which make it affordable to move more applications from legacy hard disk drives to newer memory sub-systems, such as NAND solid-state drives (SSDs). QLC memory is particularly well-tuned for read-intensive workloads, often seen in data center applications where data is normally generated once, and then read regularly to perform calculations and analysis.

A memory sub-systems implementing QLC memory can use a 16-16 coarse-fine, two-pass programming algorithm. Since a QLC memory cell stores four bits of data, there are 16 possible programming levels (i.e., 24) representing the possible values of those four bits of data. Programming a wordline begins by coarsely programming all 16 levels in a first pass. The objective of this "coarse" first pass is to program all cells rapidly to slightly below their final target programming levels. During the slower, "fine" second pass, the memory cells are programmed to a slightly higher final target programmed voltage. Such two-pass programming minimizes cell to cell (C2C) interference, as every cell and its neighbors are nearly at their final target programmed voltage when the fine programming pass is performed, and need only be "touched-up." The combination of not requiring precision programming in the first pass, and the minimized C2C coupling, leads to fast programming with a high read window budget (RWB).

The host data can be initially stored in high-performance SLC blocks for fast write operations, then migrated to higher-density QLC blocks for more efficient long-term storage. The host data is managed through media management operations, such as garbage collection which periodically move valid data between blocks to consolidate free space, refresh potentially degrading cells, and optimize both performance and endurance. The memory sub-system controller programs incoming write requests to SLC blocks for optimal host performance. During garbage collection, triggered during idle periods or scheduled times, this data is migrated to QLC blocks using two-pass programming. When SLC blocks are unavailable, data is temporarily written to TLC blocks before later migration to QLC blocks. Once in QLC blocks, data may undergo further garbage collection cycles initiated by scheduled events or media scans detecting reliability degradation. During these operations, valid data is moved between QLC blocks using two-pass programming.

As memory devices are scaled down with each new generation, the intrinsic reliability of QLC NAND degrades significantly due to tighter voltage margins and increased cell-to-cell interference effects. To address these reliability challenges, an enhanced programming scheme can be employed, which begins with a coarse programming pass to place cells near their target levels, followed by two consecutive fine programming passes. Each fine pass incrementally adjusts the cell's voltage levels, resulting in tighter final voltage distributions and improved read window budget (RWB). However, this reliability improvement comes at the cost of increased programming time (tPROG), which can impact host write performance and consistency.

The tradeoff between reliability and performance can be dynamically managed based on several key factors. As NAND cells experience more program/erase cycles, their reliability characteristics degrade, leading to multi-pass programming activation at predetermined PEC thresholds. Temperature variations also affect NAND reliability, allowing selective enabling of multi-pass programming across different temperature ranges. Additionally, the programming strategy can be adjusted based on wordline position and neighboring wordline states, as different wordlines within a block experience varying levels of program disturb effects. While this dynamic management helps balance reliability and performance needs, there is still an inevitable impact to host write performance or consistency.

Aspects of the present disclosure address the above and other deficiencies by having a memory sub-system that applies multi-pass programming during garbage collection. In response to initiation of a garbage collection operation, the memory sub-system controller determines a source block and a destination block for the garbage collection operation. In particular, to identify a specific instances of the garbage collection operation that involves a source block as one of: a TLC block, or a QLC block and a destination block as a QLC block. The memory sub-system controller determines whether the destination block of the garbage collection operation is a QLC block. Responsive to determining that the destination block is a QLC block, the memory sub-system controller determines whether the source block of the garbage collection operation is an SLC block, a TLC block, or a QLC block. In some embodiments, in response to determining that the source block of the garbage collection operation is a TLC block or a QLC block (i.e., not a SLC block), the memory sub-system controller programs the destination block with valid data of the source block during the garbage collection operation using multi-pass programming (e.g., performing garbage collection using multi-pass programming).

Alternatively, rather performing garbage collection using multi-pass programming on every wordline of the destination block, in some embodiments, the memory sub-system controller programs a subset of the wordlines of the destination block using a two-pass programming, while programming another subset of the wordlines of the destination block using a multi-pass programming. More specifically, the memory sub-system controller maintains a categorization of wordlines and/or wordline groups that are identified as weak based on their physical location within the memory array structure. These particular wordlines or wordline groups span across multiple blocks in the memory device and are tracked in dedicated data structures due to their increased susceptibility to programming and reliability issues. Accordingly, during programming of the destination block with valid data of the source block, the memory sub-system determines whether a respective wordline of the wordlines of the destination blocks is identified as weak by referencing the dedicated data structures. Responsive to determining that the respective wordline of the wordlines of the destination blocks is identified as weak, the memory sub-system controller programs the respective wordline using a multi-pass programming. Responsive to determining that the respective wordline of the wordlines of the destination blocks is not identified as weak, the memory sub-system controller programs the respective wordline using a two-pass programming. Thus, a subset of the wordlines of the destination block may be programmed using two-pass programming, while another subset of the wordlines of the destination block may be programmed using multi-pass programming.

Alternatively, rather performing garbage collection using multi-pass programming solely in response to determining that the source block of the garbage collection operation is a TLC block or a QLC block (i.e., not a SLC block), in some embodiments, the memory sub-system controller determines whether to program the destination block using a two-pass programming or a multi-pass programming. More specifically, the memory sub-system controller tracks the program erase cycles (PEC) performed on each block of the memory device (via a PEC count). Each time a block is erased and reprogrammed, the PEC count increases. The memory sub-system controller calculates an average PEC count across all blocks in the memory device. If the average PEC count exceeds a predefined threshold (indicating that the memory device is near end of life), the memory sub-system controller programs the destination block with valid data of the source block during the garbage collection operation using the multi-pass programming. If the average PEC count does not exceed the predefined threshold (indicating that the memory device is near end of life), the memory sub-system controller programs the destination block with valid data of the source block during the garbage collection operation using the two-pass programming.

Advantages of the present disclosure include, but are not limited to, improving raw bit error rate (RBER) and reducing error handling triggers for enhanced host read performance, extending data stability through improved RWB and refresh retention with reduced folding rates, thereby improving performance, quality of service (QoS), endurance and reducing latency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a garbage collection (GC) management component 113 that can apply multi-pass programming, instead of two-pass programming, during garbage collection. In some embodiments, the memory sub-system controller 115 includes at least a portion of the GC management component 113. In some embodiments, the GC management component 113 is part of the host system 120, an application, or an operating system. In other embodiments, local media controller 135 includes at least a portion of GC management component 113 and is configured to perform the functionality described herein.

The GC management component 113 determines that a garbage collection operation has been initiated. In response to initiation of the garbage collection operation, the GC management component 113 identifies a block type of a source block and a block type of a destination block of the garbage collection operation. The block type of the source block may be a SLC block, a TLC block, or a QLC block. The block type of the destination block may be a QLC.

If the block type of the source block is a SLC block, the GC management component 113 reads valid host data from the source block, and programs the valid host data to the destination block using two-pass programming. As previously described, the GC management component 113 coarsely programming all 16 levels of each wordline of the destination block in a first pass to program all cells rapidly to slightly below their final target programming levels. The GC management component 113 then programs all cells to more precisely to their final target programming levels in a second pass.

If the block type of the source block is a TLC or QLC block, the GC management component 113 reads valid host data from the source block, and programs the valid host data to the destination block using multi-pass programming. As previously described, the GC management component 113 coarsely programming all 16 levels of each wordline of the destination block in a first pass to program all cells rapidly to slightly below their final target programming levels. The GC management component 113 then programs all cells to more precisely to their final target programming levels in a second pass.

In some embodiments, rather than simply programming the valid host data to the destination block using multi-pass programming, the GC management component 113 analyzes each wordline of the destination block to determine whether to program using multi-pass programming or two-pass programming. During programming of each wordline of the destination block, the GC management component 113 determines whether a respective wordline of the destination block is categorized as weak. As previously described, a dedicated data structure maintains a list of wordlines or wordline groups that categorized as weak. Accordingly, the GC management component 113 determines whether the respective wordline of the destination block matches a wordline in the dedicated data structure. If the respective wordline of the destination block matches a wordline in the dedicated data structure, the GC management component 113 programs the respective wordline using the multi-pass programming. If the respective wordline of the destination block does not match a wordline in the dedicated data structure, the GC management component 113 programs the respective wordline using the two-pass programming. The GC management component 113 repeats the process for each wordline of the destination block.

In some embodiments, rather than simply programming the valid host data to the destination block using multi-pass programming, the GC management component 113 determines an average PEC count for the memory device 130 and/or 140. As previously described, a PEC count is maintained for each block of the memory device 130 and/or 140. Thus, the average PEC count for the memory device 130 and/or 140 represents a sum of the PEC count for each block of the memory device 130 and/or 140 divided by a number of blocks in the memory device 130 and/or 140. The GC management component 113 determines whether the average PEC count for the memory device 130 and/or 140 exceeds a predefined threshold which indicates that the memory device 130 and/or 140 is at or near end of life. If the average PEC count for the memory device 130 and/or 140 exceeds the predefined threshold, the GC management component 113 programs the valid host data to the destination block using multi-pass programming. If the average PEC count for the memory device 130 and/or 140 does not exceed the predefined threshold, the GC management component 113 programs the valid host data to the destination block using two-pass programming.

In other words, programming using multi-pass programming can be dictated by the source block and the destination block, an average PEC count, or the categorization of each wordline in the destination block. Alternatively, any suitable combination of the destination block being a QLC block and the source block being a TLC or QLC block, an average PEC count, and the categorization of each wordline in the destination block may be used to decide whether to program the destination block using multi-pass programming or two-pass programming. Additionally, alternative embodiments that are suitable in dictating when to program the destination block using multi-pass programming as opposed to two-pass programming is considered.

Figure 2:
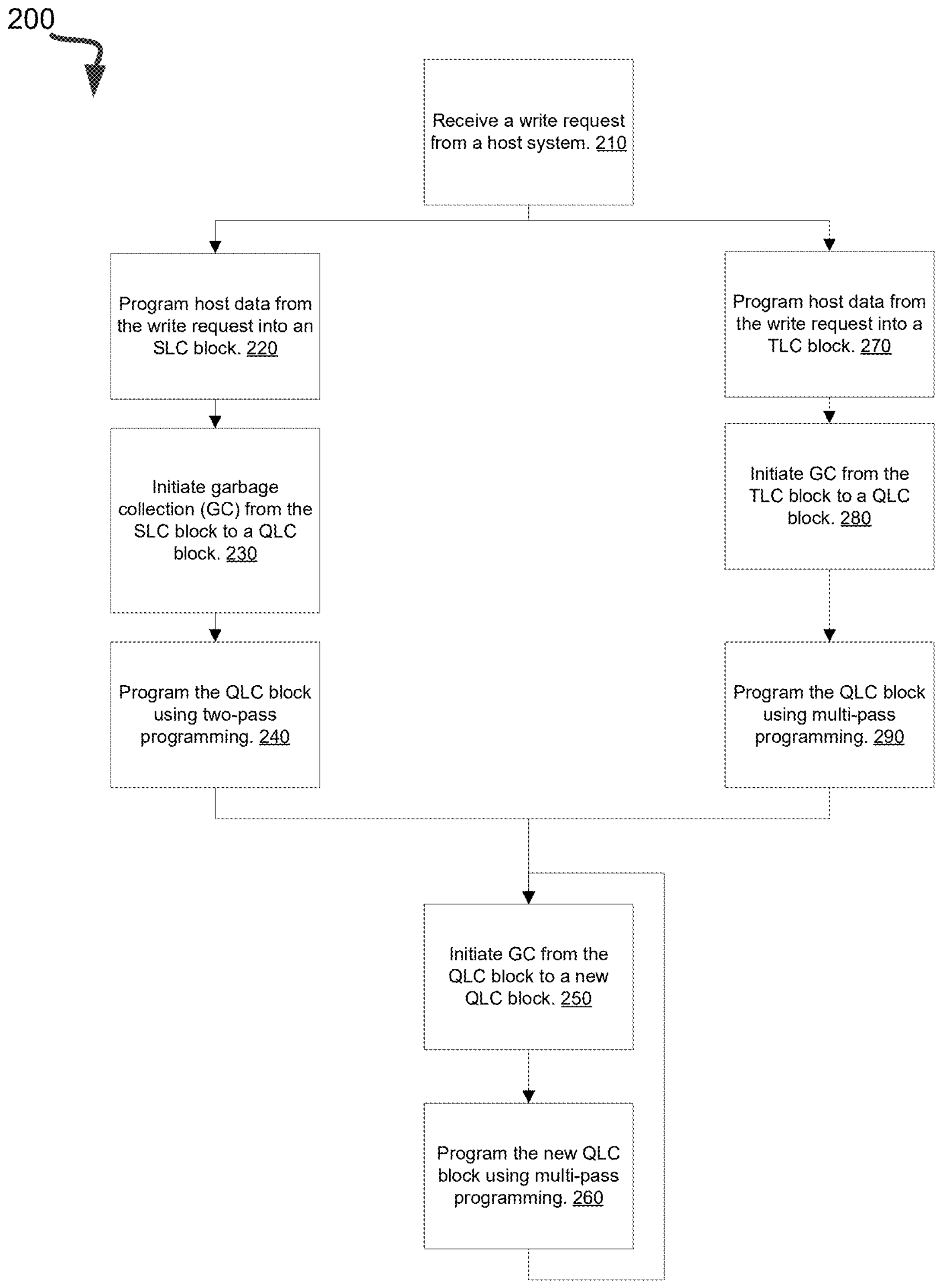
FIG. 2 is a flow diagram of an example data path for multi-pass programming for garbage collection in accordance with some embodiments of the present disclosure.

FIG. 2 is a flow diagram of an example data path 200 for multi-pass programming for garbage collection, in accordance with some embodiments of the present disclosure. At block 210, a memory sub-system controller (e.g., memory sub-system controller 110 of FIG. 1) receives a write request from a host system (e.g., host system 120 of FIG. 1).

At block 220, the memory sub-system controller programs host data from the write request into an SLC block. At block 230, the memory sub-system controller may initiate GC from an SLC block (e.g., a source block) to a QLC block (e.g., destination block). At block 240, the memory sub-system controller reads host data from the SLC block and programs, using two-pass programming, the host data to the QLC. At block 250, the memory sub-system controller may initiate GC from a QLC block (e.g., the source block) to a new QLC block (e.g., the destination block). At block 260, the memory sub-system controller reads host data from the QLC block and programs, using multi-pass programming, the host data to the new QLC.

In some embodiments, instead of the memory sub-system controller programming the SLC block (e.g., block 220), at block 270, the memory sub-system controller programs host data from the write request into a TLC block, instead of the SLC block. At block 280, the memory sub-system controller may initiate GC from the TLC block (e.g., the source block)

to a QLC block (e.g., the destination block). At block 290, the memory sub-system controller reads host data from the TLC block (e.g., the source block) and programs, using a multi-pass programming, the host data to the QLC (e.g., the destination block).

Figure 3:
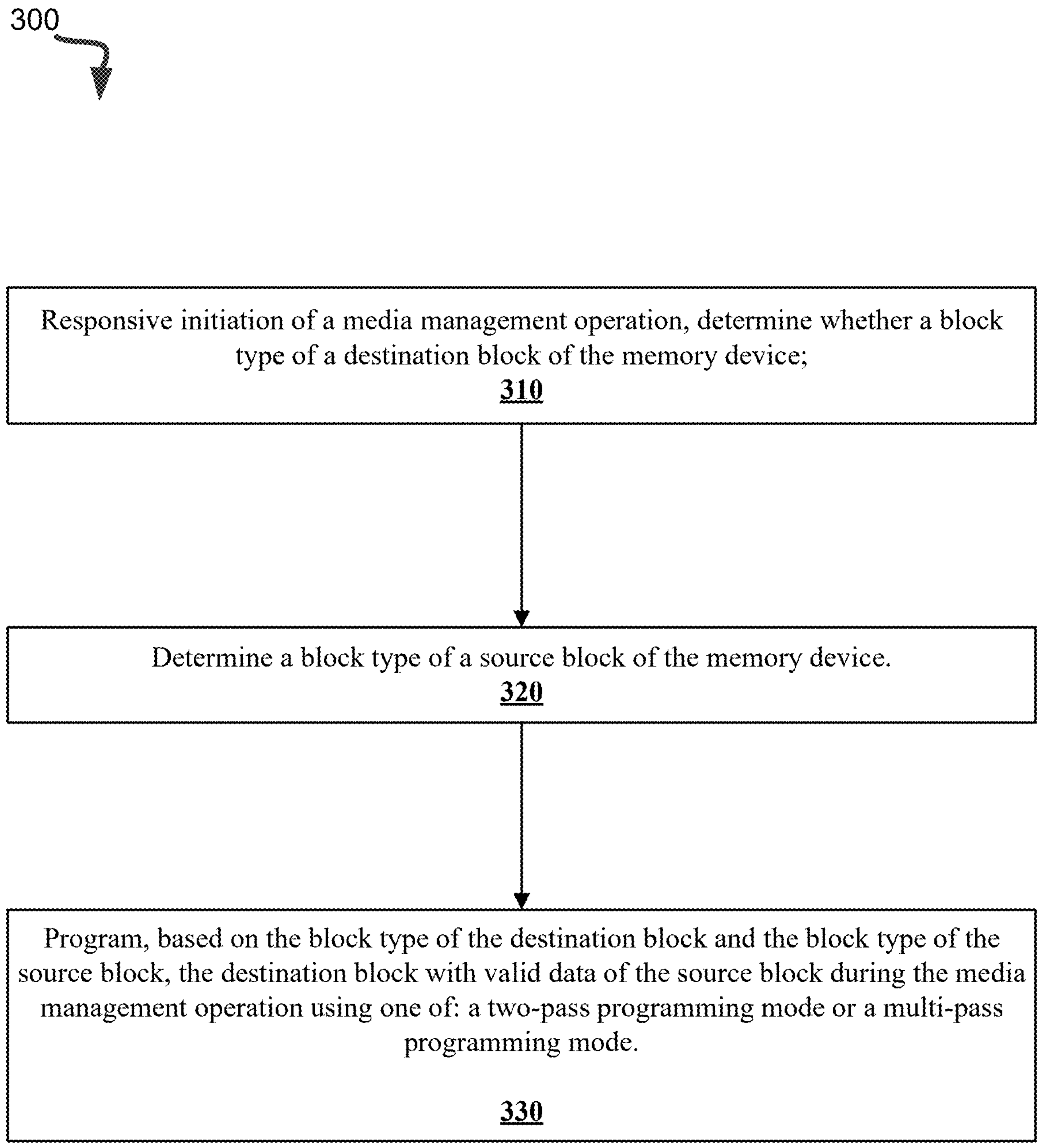
FIG. 3 is a flow diagram of an example method for multi-pass programming for garbage collection in accordance with some embodiments of the present disclosure.

FIG. 3 is a flow diagram of an example method 300 to multi-pass programming for garbage collection, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the GC management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Responsive initiation of a media management operation, at block 310, the processing logic determines a block type of a destination block of a memory device. The block type of the destination block may be a single-level cell (SLC) block. At block 320, the processing logic determines a block type of a source block of the memory device. The block type of the source block may be a triple-level cell (TLC) block or a quad-level (QLC) block. At block 330, the processing logic programs, based on the block type of the destination block and the block type of the source block, the destination block with valid data of the source block during the media management operation using one of: a two-pass programming mode or a multi-pass programming mode.

As previously described, the processing logic may determine that the block type of the destination block and the block type of the source block may be a QLC. Accordingly, the processing logic programs the destination block with valid data of the source block during the media management operation using the multi-pass programming mode. Multi-pass programming mode may include programming cells of the destination block to a first intermediate voltage levels in a first pass by applying first voltage step increments, then programming cells of the destination block to a second intermediate voltage levels in a second pass by applying second voltage step increments, and then finally programming cells of the destination block to final voltage levels representing valid date of the source block in a third pass by applying third voltage step increments.

As previously described, the processing logic may determine that the block type of the destination block may be a QLC or TLC and the block type of the source block may be a SLC. Accordingly, the processing logic programs the destination block with valid data of the source block during the media management operation using the two-pass programming mode. Two-pass programming mode may include programming cells of the destination block to intermediate voltage levels in a first pass by applying first voltage step increments and programming cells of the destination block to final voltage levels representing valid data of the source block in a second pass by applying second voltage step increments.

Depending on the embodiment, as previously described, multi-pass programming can be applied, in addition to block type, based on average program erase cycle (PEC) count or categorization of weak wordlines in the destination block. For example, if the average PEC count exceeds a certain threshold, multi-pass programming is used; otherwise, two-pass programming is utilized. Additionally, the categorization of weak wordlines may determine which wordlines within the destination block use multi-pass programming, instead of two-pass programming.

Figure 4:
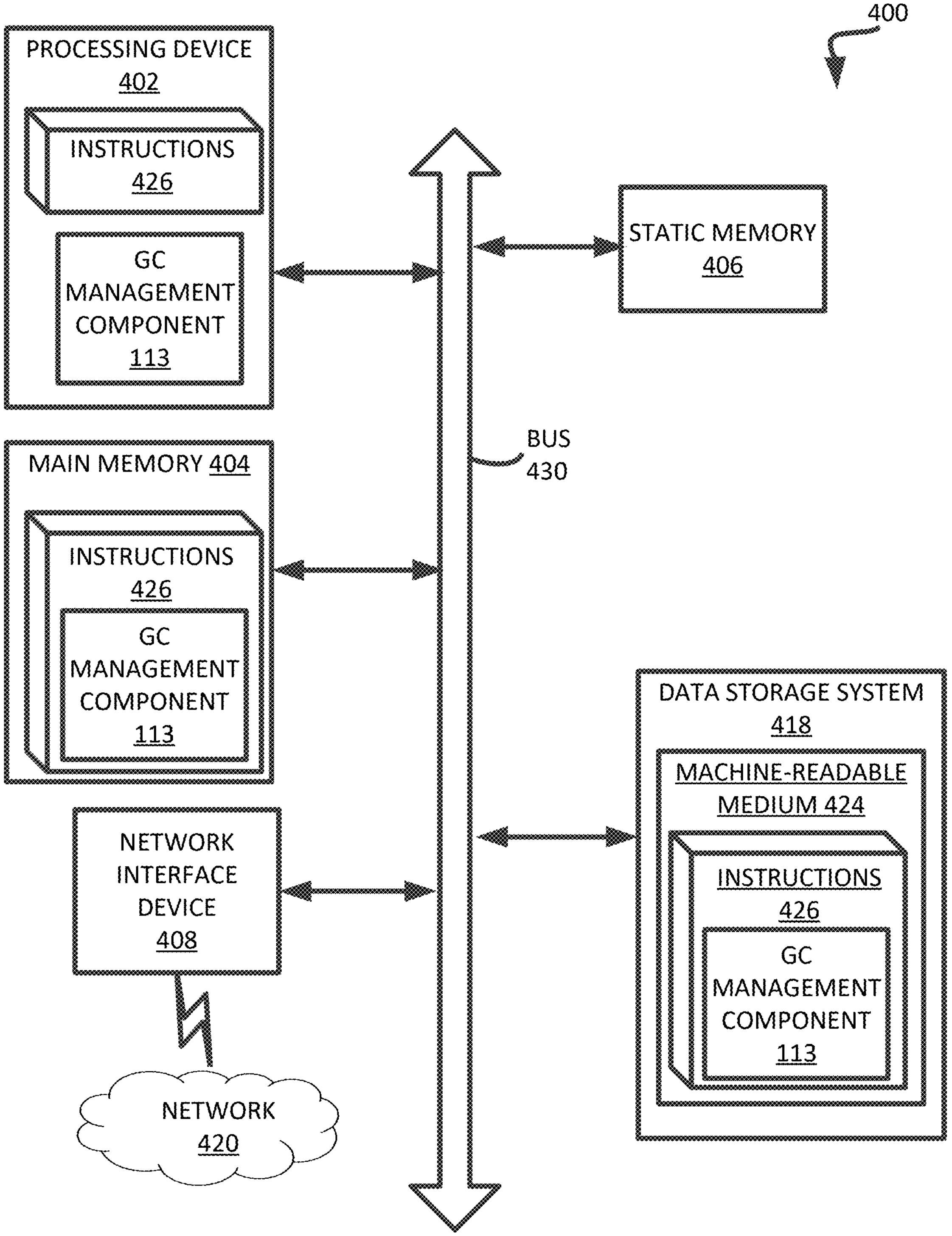
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the GC management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a GC management component (e.g., the GC management component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

responsive to initiation of a media management operation, determining a block type of a destination block of the memory device;

determining a block type of a source block of the memory device; and programming, based on the block type of the destination block and the block type of the source block, the destination block with valid data of the source block during the media management operation using one of: a two-pass programming mode or a multi-pass programming mode.

2. The system of claim 1, wherein the block type of the destination block is a single-level cell (SLC) block.

3. The system of claim 1, wherein the block type of the source block is one of: a triple-level cell (TLC) block or a QLC block.

4. The system of claim 1, wherein programming, based on the block type of the destination block and the block type of the source block, the destination block with valid data of the source block during the media management operation using the multi-pass programming mode comprises:

programming, in a first pass, cells of the destination block to first intermediate voltage levels by applying first voltage step increments;

programming, in a second pass, cells of the destination block to second intermediate voltage levels by applying second voltage step increments; and programming, in a third pass, cells of the destination block to final voltage levels representing valid data of the source block by applying third voltage step increments.

5. The system of claim 1, wherein programming, based on the block type of the destination block and the block type of the source block, the destination block with valid data of the source block during the media management operation using the two-pass programming mode comprises:

programming, in a first pass, cells of the destination block to intermediate voltage levels by applying first voltage step increments; and programming, in a second pass, cells of the destination block to final voltage levels representing valid data of the source block by applying second voltage step increments.

6. The system of claim 1, wherein the media management operation is initiated by a media scan or at predetermined intervals.

7. The system of claim 1, wherein the media management operation is a garbage collection operation.

8. A method comprising:

responsive to initiation of a media management operation, determining a block type of a destination block of a memory device;

determining a block type of a source block of the memory device; and programming, based on the block type of the destination block and the block type of the source block, the destination block with valid data of the source block during the media management operation using one of: a two-pass programming mode or a multi-pass programming mode.

9. The method of claim 8, wherein the block type of the destination block is a single-level cell (SLC) block.

10. The method of claim 8, wherein the block type of the source block is one of: a triple-level cell (TLC) block or a QLC block.

11. The method of claim 8, wherein programming, based on the block type of the destination block and the block type of the source block, the destination block with valid data of the source block during the media management operation using the multi-pass programming mode comprises:

programming, in a first pass, cells of the destination block to first intermediate voltage levels by applying first voltage step increments;

programming, in a second pass, cells of the destination block to second intermediate voltage levels by applying second voltage step increments; and programming, in a third pass, cells of the destination block to final voltage levels representing valid data of the source block by applying third voltage step increments.

12. The method of claim 8, wherein programming, based on the block type of the destination block and the block type of the source block, the destination block with valid data of the source block during the media management operation using the two-pass programming mode comprises:

programming, in a first pass, cells of the destination block to intermediate voltage levels by applying first voltage step increments; and programming, in a second pass, cells of the destination block to final voltage levels representing valid data of the source block by applying second voltage step increments.

13. The method of claim 8, wherein the media management operation is initiated by a media scan or at predetermined intervals.

14. The method of claim 8, wherein the media management operation is a garbage collection operation.

15. A non-transitory computer-readable storage medium comprising instructions that, when executed by a processing device, cause the processing device to perform operations comprising:

responsive to initiation of a media management operation, determining a block type of a destination block of a memory device;

determining a block type of a source block of the memory device; and programming, based on the block type of the destination block and the block type of the source block, the destination block with valid data of the source block during the media management operation using one of: a two-pass programming mode or a multi-pass programming mode.

16. The non-transitory computer-readable storage medium of claim 15, wherein the block type of the destination block is a single-level cell (SLC) block.

17. The non-transitory computer-readable storage medium of claim 15, wherein the block type of the source block is one of: a triple-level cell (TLC) block or a QLC block.

18. The non-transitory computer-readable storage medium of claim 15, wherein programming, based on the block type of the destination block and the block type of the source block, the destination block with valid data of the source block during the media management operation using the multi-pass programming mode comprises:

programming, in a first pass, cells of the destination block to first intermediate voltage levels by applying first voltage step increments;

programming, in a second pass, cells of the destination block to second intermediate voltage levels by applying second voltage step increments; and programming, in a third pass, cells of the destination block to final voltage levels representing valid data of the source block by applying third voltage step increments.

19. The non-transitory computer-readable storage medium of claim 15, wherein programming, based on the block type of the destination block and the block type of the source block, the destination block with valid data of the source block during the media management operation using the two-pass programming mode comprises:

programming, in a first pass, cells of the destination block to intermediate voltage levels by applying first voltage step increments; and programming, in a second pass, cells of the destination block to final voltage levels representing valid data of the source block by applying second voltage step increments.

20. The non-transitory computer-readable storage medium of claim 15, wherein the media management operation is a garbage collection operation.

* * * * *